E. BURHORN.
BY-PASS.
APPLICATION FILED NOV. 6, 1908.

940,920.

Patented Nov. 23, 1909.
2 SHEETS—SHEET 1.

WITNESSES:
A. Boulogne
B. N. Coffey

INVENTOR
Edwin Burhorn

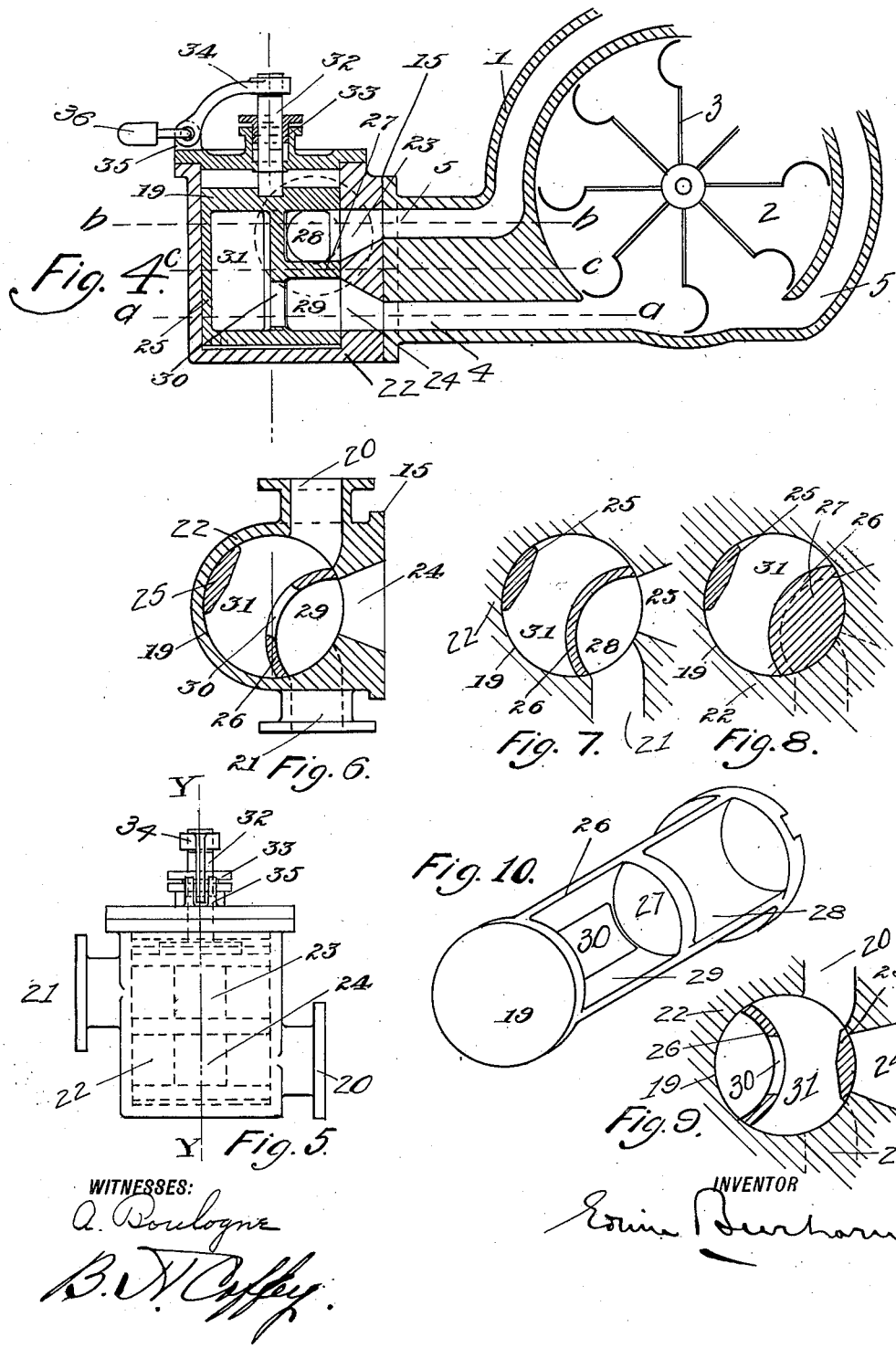

UNITED STATES PATENT OFFICE.

EDWIN BURHORN, OF HOBOKEN, NEW JERSEY.

BY-PASS.

940,920.

Specification of Letters Patent.   Patented Nov. 23, 1909.

Application filed November 6, 1908.   Serial No. 461,334.

*To all whom it may concern:*

Be it known that I, EDWIN BURHORN, a citizen of the United States, and a resident of Hoboken, in the county of Hudson and State of New Jersey, have invented certain new and useful Improvements in By-Passes, of which the following is a specification.

My invention belongs to the same class, and has in general the same objects, as described in my Patent No. 900,479, dated October 6th, 1908, which may be briefly stated as follows:

My invention is an improved by-pass, to be used in connection with a meter, or any apparatus through which it is desirable to circulate a current of fluid, to be taken from, and returned to, the same pipe line; and where it is desirable to cut in, or cut out the meter or apparatus at will. In my present invention I have attained these objects with simpler apparatus than that described in my patent referred to; I have also introduced some improvements, tending to make the apparatus more accessible for cleaning and repairs.

Figure 1:
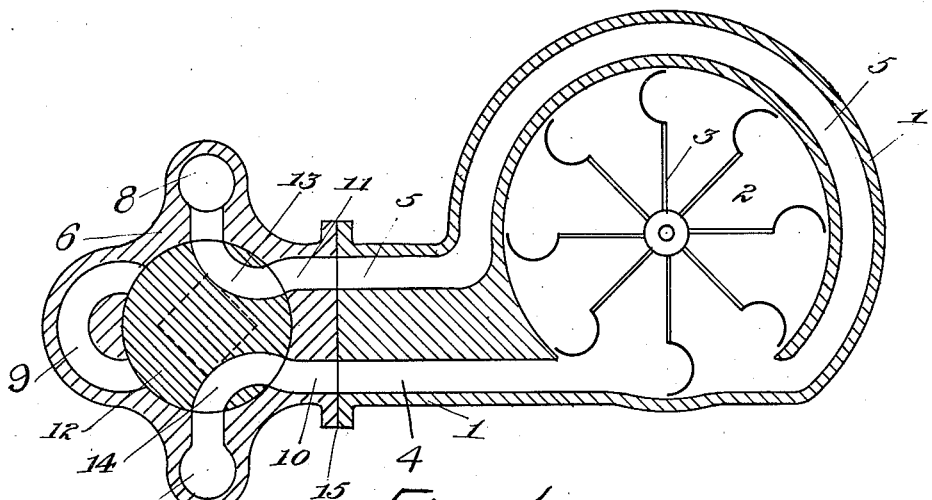
Figure 3:
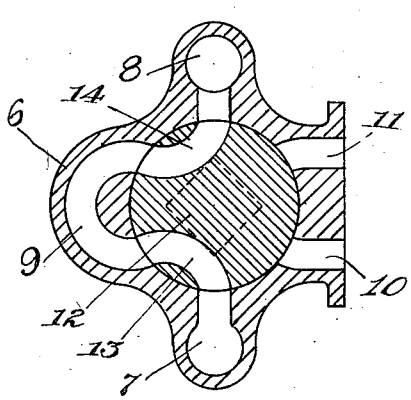
Figure 2:
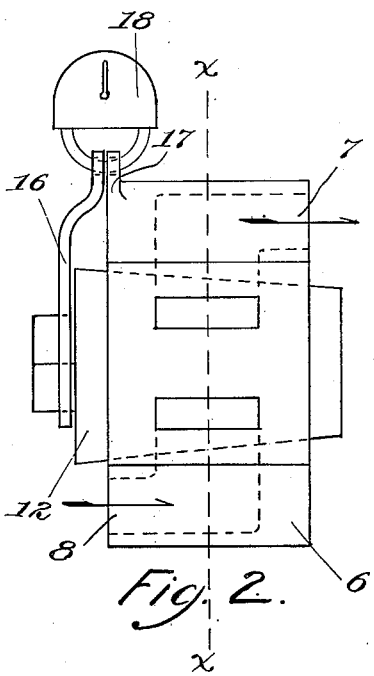

Referring now to the drawings in which similar figures refer to similar parts. Figure 1; is a horizontal section on line $x$—$x$ Fig. 2 of my by-pass, applied to a water meter. Fig. 2; is an end elevation of Figs. 1 and 3. Fig. 3; is a horizontal section of my by-pass on line $x$—$x$ of Fig. 2, showing the controlling plug in a different position from that shown in Fig. 1. The meter is not shown. Fig. 4; is a horizontal section on line $y$—$y$ Fig. 5 of an alternate form of by-pass, attached to a water meter; the latter being partly broken away. Fig. 5; is an elevation of Fig. 4, the meter being omitted. Fig. 6; is a part section on line $a$—$a$ Fig. 4. Fig. 7; is a part section on line $b$—$b$ Fig. 4. Fig. 8; is a part section on line $c$—$c$ Fig. 4. Fig. 9; is a part section on line $a$—$a$ Fig. 4, after plug is rotated. Fig. 10; is an isometric view of the valve plug.

In detail; 1 is a meter casing, inclosing the space 2, in which revolves the impulse wheel 3, actuated by a tangential current of fluid entering through the passage 4, and leaving by the passage 5. The form of meter shown, is known as a "current meter"; one of the "displacement type" would be equally applicable.

Integral with, or rigidly attached to, the casing 1, is the valve body 6, containing an inlet passage 7 and an outlet passage 8 and interior passages 9, 10, 11. Rotatable within the body 6 is the taper plug 12, containing the ducts 13 and 14.

To operate the meter, the plug 12 is turned to the position shown in Fig. 1; the fluid enters at 7 then by plug duct 14, body passage 10, and passage 4, enters the space 2, rotates the wheel 3 and leaves by the passage 5; then by passages 11 and 13 the outlet 8 is reached, and the cycle is complete.

To by-pass the meter, the plug 12 is turned to the position of Fig. 3, in which it will be observed the passages 10 and 11, giving access to the meter casing are closed; the flow being diverted to the passage 9 in the body 6; thus cutting out the meter, without stopping the flow in the main line.

With the plug in position of Fig. 3, the meter may be disconnected at the flange 15, for cleaning, adjustment or repairs; without in any way interfering with the flow in the main line.

While the meter is in operation, the plug 12, may be locked in position, by the bar 16 attached to same; the lug 17 integral with the body 6; and the padlock 18, connecting the bar and lug, thus preventing tampering with the by-pass when attached to the meter or other apparatus.

In the alternate form of by-pass, a cylindrical plug 19 is employed, similar in principle to those in use on Corliss engines.

A valve body 22, inclosing the rotatable plug 19; has an inlet 20 and outlet 21, also interior passages 23 and 24, connecting with the passages 4 and 5 of the meter casing 1. The plug 19 has a bearing strip 25 extending its full length on one side, and a concave part 26, divided by the partition 27 into two chambers 28 and 29. In the concave back of the chamber 29, is the opening 30, communicating with the duct 31. The plug is rotated by the T piece 32, extending through the stuffing box 33 in the usual way.

When the plug is in the position shown in Figs. 4, 5, 6, 7, and 8, the meter is in the circuit. The fluid enters at 20, thence into the space 31 in the plug; passing through the opening 30 it enters the chamber 29, communicating with the passage 4 of the meter, through the passage 24. After leaving the meter by passage 5, it enters passage 23, opening into valve chamber 28, which conducts it to discharge opening 21, thus completing the cycle.

To by-pass the meter, the plug is rotated to the position of Fig. 9, where it will be observed the bearing strip 25 closes the passages 23 and 24, (23 not being shown being directly back of 24,) so shutting off communication with the meter; at the same time the duct 31 registers with the two passages 20 and 21, thus permitting free passage of the fluid from inlet to outlet.

The plug may be locked in position by means of the bar 34 connected to the T piece 32; the lug 35 integral with the valve body 22, and the padlock 36, connecting the bar and lug; as clearly shown.

The meter may be disconnected at the flange 15 when desired.

A valuable feature hereof is in having the meter or other apparatus on the one hand and the by-pass valve casing on the other hand attachable and detachable from each other; yet when attached being in direct contact with each other, that is, avoiding the necessity of communicating piping or equivalent; and this advantageous result is permitted, as shown, by reason of the meter having a long interior passage within its casing, which brings its outlet close to its inlet or in other words causes the inlet and outlet apertures to lie close together on the casing wall.

Having now described my invention I claim as new and desire to secure by Letters Patent—

1. In a by-pass a hollow valve body containing in its walls fixed separate inlet and outlet passages for connection to a pipe line, and fixed separate supply and discharge passages for connection to an apparatus to be served, (as a meter); in combination with a movable valve seated in the hollow of said valve body and containing duct portions so arranged with relation to said passages that when the valve is in one position the flow will be in order through the inlet passage, the valve, the supply passage, the said apparatus, the discharge passage, the valve, and the outlet passage, and when the valve is in a second position the flow will be through the inlet passage, the valve, and the outlet passage, with the supply and discharge passages and said apparatus cut off; and a meter comprising a casing, and inlet and outlet passages (as 4 and 5), with said meter casing detachably secured directly to said valve body so that said meter inlet and outlet passages register respectively with said valve body supply and discharge passages.

2. In a by-pass a hollow valve body containing in its walls fixed separate inlet and outlet passages for connection to a pipe line, and fixed separate supply and discharge passages for connection to an apparatus to be served, (as a meter); in combination with a movable valve seated in the hollow of said valve body and containing duct portions so arranged with relation to said passages that when the valve is in one position the flow will be in order through the inlet passage, the valve, the supply passage, the said apparatus, the discharge passage, the valve, and the outlet passage, and when the valve is in a second position the flow will be through the inlet passage, the valve, and the outlet passage, with the supply and discharge passages and said apparatus cut off; and an apparatus to be served having an inlet and outlet (as 4 and 5) with said apparatus detachably secured directly to said valve body so that said inlet and outlet register respectively with said valve body supply and discharge passages.

3. In a by-pass a hollow valve body having a by-way passage (as 9) and containing in its walls at six substantially equally spaced points 1st an inlet passage for connection to a pipe line, 2nd a supply passage for connection to an apparatus to be served, 3rd a discharge passage for connection to said apparatus, 4th an outlet passage for connection to said pipe line, 5th an outlet from said by-way passage, and 6th an inlet thereto; in combination with a rotatable valve seated in the hollow of said body and containing two ducts so arranged that when in one position one duct connects said inlet passage and said supply passage, and the other duct said discharge passage and said outlet passage, whereby when the valve is reversed the inlet and outlet passages will be both connected to said by-way passage and the said apparatus will be cut off.

4. The combination of a by-pass valve and an apparatus (as a meter), the two being detachable and attachable and when attached being in direct contact with each other, the said apparatus being designed with a casing having inlet and outlet apertures in its wall, and a long interior passage within its casing wall for bringing said apertures close together on the casing wall, and the by-pass having supply and discharge passages corresponding in location with said inlet and outlet.

In testimony whereof I have signed my name to this specification, in the presence of two subscribing witnesses, on the 2nd day of November, 1908.

EDWIN BURHORN.

In presence of—
A. BOULOGNA,
B. H. COFFEY.